US011256410B2

(12) United States Patent
Feng et al.

(10) Patent No.: US 11,256,410 B2
(45) Date of Patent: Feb. 22, 2022

(54) AUTOMATIC LAUNCH AND DATA FILL OF APPLICATION

(71) Applicant: Lenovo (Singapore) Pte. Ltd., New Tech Park (SG)

(72) Inventors: Xin Feng, Arcadia, CA (US); Mei-Wen Sun, Raleigh, NC (US); James Anthony Hunt, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1871 days.

(21) Appl. No.: 14/160,752

(22) Filed: Jan. 22, 2014

(65) Prior Publication Data

US 2015/0205517 A1 Jul. 23, 2015

(51) Int. Cl.
| | |
|---|---|
| *G06F 3/0488* | (2013.01) |
| *G06K 9/00* | (2006.01) |
| *G06F 40/166* | (2020.01) |
| *G06F 3/04883* | (2022.01) |

(52) U.S. Cl.
CPC ..... *G06F 3/04883* (2013.01); *G06K 9/00402* (2013.01); *G06F 40/166* (2020.01)

(58) Field of Classification Search
CPC .................. G06F 17/24; G06F 3/04883; G06F 2203/04101; G06F 3/04993; G06F 40/166; G06K 9/00402
USPC .......................................................... 715/268
See application file for complete search history.

(56) References Cited

U.S. PATENT DOCUMENTS

| | | | | |
|---|---|---|---|---|
| 4,866,646 A | * | 9/1989 | Nakamura | G06F 3/033 708/141 |
| 5,243,149 A | * | 9/1993 | Comerford | G06F 1/1626 178/18.03 |
| 6,088,481 A | * | 7/2000 | Okamoto | G06F 3/0488 345/179 |

(Continued)

FOREIGN PATENT DOCUMENTS

| | | |
|---|---|---|
| CN | 201577133 U | 9/2010 |
| CN | 102681747 | 9/2012 |

(Continued)

OTHER PUBLICATIONS

Xin Feng, Mei-Wen Sun, James Anthony Hunt, "Presenting User Interface on a First Device Based on Detection of a Second Device Within a Proximity to the First", related pending U.S. Appl. No. 14/294,792, filed Jun. 3, 2014.

(Continued)

*Primary Examiner* — Stephen S Hong
*Assistant Examiner* — Nicholas Hasty
(74) *Attorney, Agent, or Firm* — John M. Rogitz; John L. Rogitz

(57) ABSTRACT

In one aspect, an apparatus includes a processor, a touch-enabled display operatively coupled to the processor, and a memory accessible to the processor. The memory bears instructions executable by the processor to execute a handwriting recognition engine automatically without requiring user selection of a handwriting recognition application to start the handwriting recognition engine, receive input from the touch-enabled display, determine whether the input indicates a character, and automatically store the character responsive to a determination that the input indicates a character.

1 Claim, 4 Drawing Sheets

(56) References Cited

U.S. PATENT DOCUMENTS

| | | | | |
|---|---|---|---|---|
| 6,128,007 | A * | 10/2000 | Seybold | G06F 3/03545 345/174 |
| 6,525,716 | B1 * | 2/2003 | Makino | G06F 3/04886 178/18.01 |
| 6,957,233 | B1 * | 10/2005 | Beezer | G06F 17/241 |
| 7,032,187 | B2 | 4/2006 | Keely et al. | |
| 7,123,770 | B2 * | 10/2006 | Raghupathy | G06K 9/222 382/202 |
| 7,751,623 | B1 * | 7/2010 | Simmons | G06F 17/242 345/173 |
| 8,315,482 | B2 * | 11/2012 | Hou | G06F 17/242 382/101 |
| 8,351,904 | B2 * | 1/2013 | Kim | H04L 12/5885 379/142.04 |
| 2003/0214540 | A1 | 11/2003 | Huapaya et al. | |
| 2003/0215145 | A1 * | 11/2003 | Shilman | G06K 9/222 382/195 |
| 2004/0160427 | A1 | 8/2004 | Keely et al. | |
| 2004/0172588 | A1 | 9/2004 | Mattaway | |
| 2005/0052434 | A1 | 3/2005 | Kolmykov-Zotov et al. | |
| 2005/0281467 | A1 * | 12/2005 | Stahovich | G06K 9/00416 382/202 |
| 2006/0161870 | A1 | 7/2006 | Hotelling et al. | |
| 2009/0158201 | A1 | 6/2009 | Iampietro et al. | |
| 2011/0161341 | A1 * | 6/2011 | Johnston | G06F 17/30976 707/766 |
| 2011/0285669 | A1 | 11/2011 | Lassesson et al. | |
| 2012/0120002 | A1 | 5/2012 | Ota | |
| 2012/0302167 | A1 * | 11/2012 | Yun | G06F 3/04883 455/41.2 |
| 2013/0285929 | A1 | 10/2013 | Theimer et al. | |
| 2013/0321314 | A1 * | 12/2013 | Oh | G06F 3/041 345/173 |
| 2014/0055399 | A1 * | 2/2014 | Lee | G06F 3/03 345/173 |
| 2014/0059493 | A1 * | 2/2014 | Kim | G06F 3/0488 715/835 |

FOREIGN PATENT DOCUMENTS

| | | |
|---|---|---|
| CN | 103197843 A | 7/2013 |
| CN | 103631514 A | 3/2014 |
| CN | 103092502 B | 11/2018 |
| GB | 2462171 A | 2/2010 |

OTHER PUBLICATIONS

Scott Edwards Kelso, John Weldon Nicholson, Steven Richard Perrin, Jian Li, "Presenting User Interface on a First Device Based on Detection of a Second Device Within a Proximity to the First Device", related pending U.S. Appl. No. 14/294,792, non-final office action dated Apr. 7, 2017.

"How to fix the height offset on your Wacom Bamboo", Ang's Tech Bits, May 1, 2013, retrieved from https://web.archive.org/web/20131210043507/https://angstechbits.wordpress.com/2013/05/01/how-to-fix-the-height-offset-on-your-wacom-bamboo-pen/.

Scott Edwards Kelso, John Weldon Nicholson, Steven Richard Perrin, Jian Li, "Presenting User Interface on a First Device Based on Detection of a Second Device Within a Proximity to the First Device", related U.S. Appl. No. 14/294,792, Final Office Action dated Nov. 20, 2017.

Scott Edwards Kelso, John Weldon Nicholson, Steven Richard Perrin, Jian Li, "Presenting User Interface on a First Device Based on Detection of a Second Device Within a Proximity to the First Device", related pending U.S. Appl. No. 14/294,792, applicant's response to non-final office action filed Jul. 6, 2017.

Scott Edward Kelso, John Weldon Nicholson, Steven Richman Perrin, Jian Li, "Presenting User Interface on a First Device Based on Detection of a Second Device Within a Proximity to the First Device", related pending U.S. Appl. No. 14/294,792, non-final office action dated Jan. 29, 2018.

Scott Edward Kelso, John Weldon Nicholson, Steven Richman Perrin, Jian Li, "Presenting User Interface on a First Device Based on Detection of a Second Device Within a Proximity to the First Device", related pending U.S. Appl. No. 14/294,792, applicant's response to non-final office action filed Mar. 22, 2018.

"Jquery—Only execute function if mouse has hovered for more than 1 second", published by Stack Overflow, Sep. 23, 2013, retrieved from https://stackoverflow.com/questions/18965792/only-execute-function-if-mouse-has-hovered-for-more-than-1-second (Year: 2013).

"Shorthand Options Make Life Easier with Shorthand Mappings", archived Jul. 11, 2016, retrieved from https://web.archive, org/web/20130711135624/http://qtip2.com/options (Year: 2013).

"Transition Delay Delays" by Chris Coyier, Jun. 26, 2012, retrieved from https://css-tricks.com/transition-delay-delays/ (Year:2012).

Scott Edwards Kelso, John Weldon Nicholson, Steven Richard Perrin, Jian Li, "Presenting User Interface on a First Device Based on Detection of a Second Device Within a Proximity to the First Device", related U.S. Appl. No. 14/294,792, Final Office Action dated Jul. 16, 2018.

Scott Edward Kelso, John Weldon Nicholson, Steven Richard Perrin, Jian Li, "Presenting User Interface on a First Device Based on Detection of a Second Device Within a Proximity to the First Device", Applicant's response to related pending U.S. Appl. No. 14/294,792, filed Oct. 16, 2018.

* cited by examiner

AUTOMATIC LAUNCH AND DATA FILL OF APPLICATION

I. FIELD

The present application relates generally to automatically launching and filling data on computer applications.

II. BACKGROUND

Memorandum applications have been provided allowing users to create memos using, e.g., touch screens. But as understood herein, this requires the user to first launch the application prior to being able to take a memo and this can be distracting during, for example, a concurrent phone call.

SUMMARY

Accordingly, in a first aspect, an apparatus includes a processor, a touch-enabled display operatively coupled to the processor, and a memory accessible to the processor. The memory bears instructions executable by the processor to execute a handwriting recognition engine automatically without requiring user selection of a handwriting recognition application to start the handwriting recognition engine, receive input from the touch-enabled display, determine whether the input indicates a character, and automatically store the character responsive to a determination that the input indicates a character.

In another aspect, a method includes running a handwriting recognition engine in the background on a device so that a user need only start writing on a touchscreen display of the device any time during operation of the device to enter handwriting without starting an application to do so. The method also includes capturing handwriting, and automatically storing at least a portion of the handwriting without user command to do so.

In another aspect, an apparatus includes a processor and a memory accessible to the processor. The memory bears instructions executable by the processor to execute a handwriting recognition engine automatically, receive input from a touch-enabled display, determine whether the input indicates handwriting, determine whether the input indicates a character, responsive to a determination that the input indicates handwriting, and automatically store the character responsive to a determination that the input indicates a character.

The details of present principles, both as to their structure and operation, can best be understood in reference to the accompanying drawings, in which like reference numerals refer to like parts, and in which:

DETAILED DESCRIPTION

Figure 1:
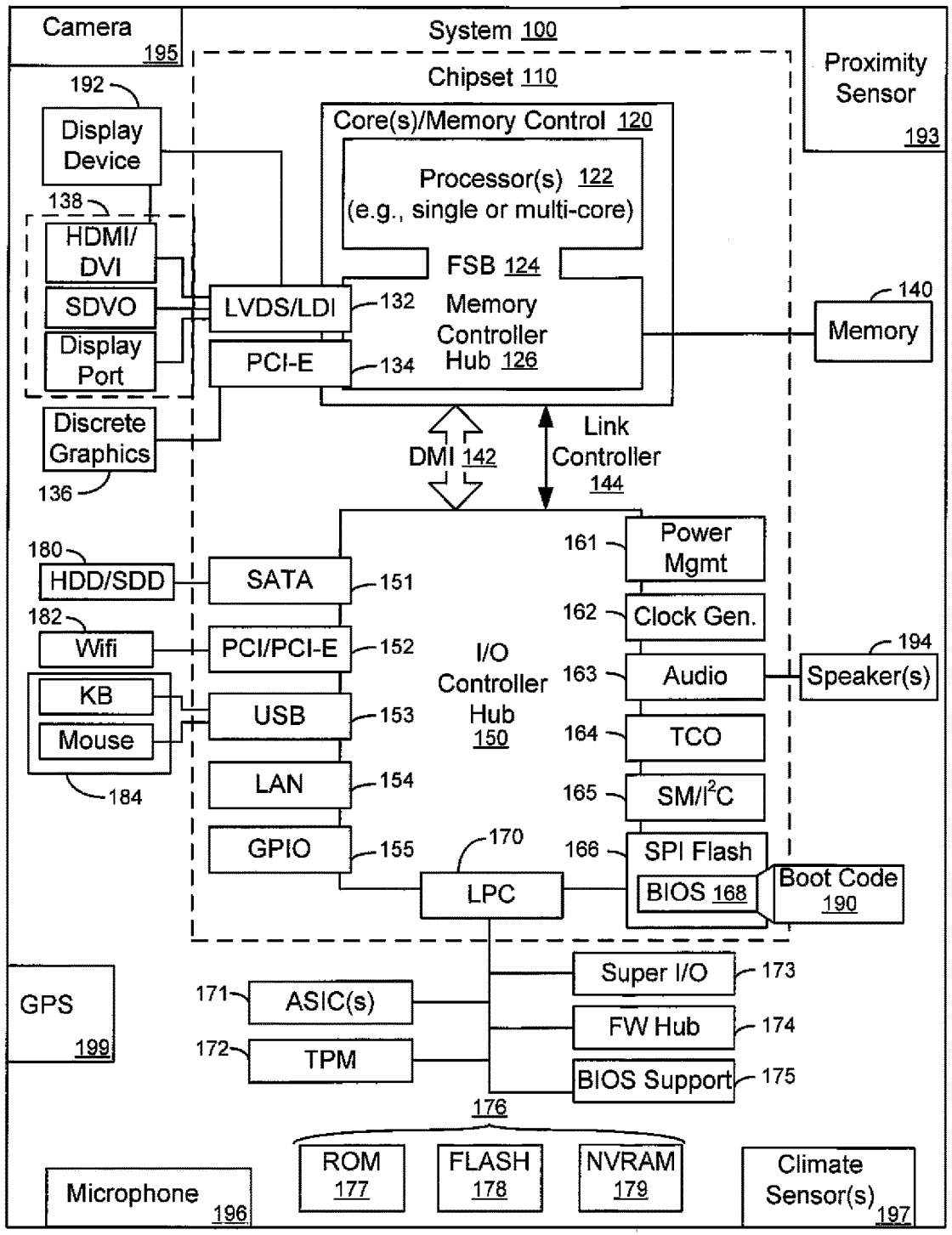
FIG. 1 is a block diagram of an exemplary device in accordance with present principles.

This disclosure relates generally to (e.g. consumer electronics (CE)) device based user information. With respect to any computer systems discussed herein, a system may include server and client components, connected over a network such that data may be exchanged between the client and server components. The client components may include one or more computing devices including televisions (e.g. smart TVs, Internet-enabled TVs), computers such as laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now in reference to FIG. 1, it shows an exemplary block diagram of an exemplary computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, so-called "convertible" devices such as e.g. a tablet that may be converted to a laptop by virtue of being connected to a soft keyboard, and/or other smart devices, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 also may include sensors and/or a sensor array including e.g. a proximity, infrared, sonar, and/or heat sensor 193 providing input to the processor 122 and configured in accordance with present principles for sensing e.g. body heat of a person and/or the proximity of at least a portion of the person to at least a portion of the system 100 such as the sensor 193 itself. Also in some embodiments, the system 100 may include one or more cameras 195 providing input to the processor 122. The camera 195 may be, e.g., a thermal imaging camera, a digital camera such as a webcam, and/or a camera integrated into the system 100 and controllable by the processor 122 to gather pictures/images and/or video. Moreover, the system 100 may include an audio receiver/microphone (e.g. a microphone or microphone array) 196 for e.g. entering input such as a command to the system 100 in accordance with present principles.

The system 100 may also include one or more motion sensors 198 (such as e.g., an accelerometer and/or a gesture sensor (e.g. for sensing gestures in free space associated by the device with commands, etc.) providing input to the processor 122 in accordance with present principles. Though not shown, still other sensors may be included and their output used in accordance with present principles, such as e.g. biometric sensors, sound sensors, orientation sensors, location sensors, scan sensors, and/or time sensors. Also note that a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
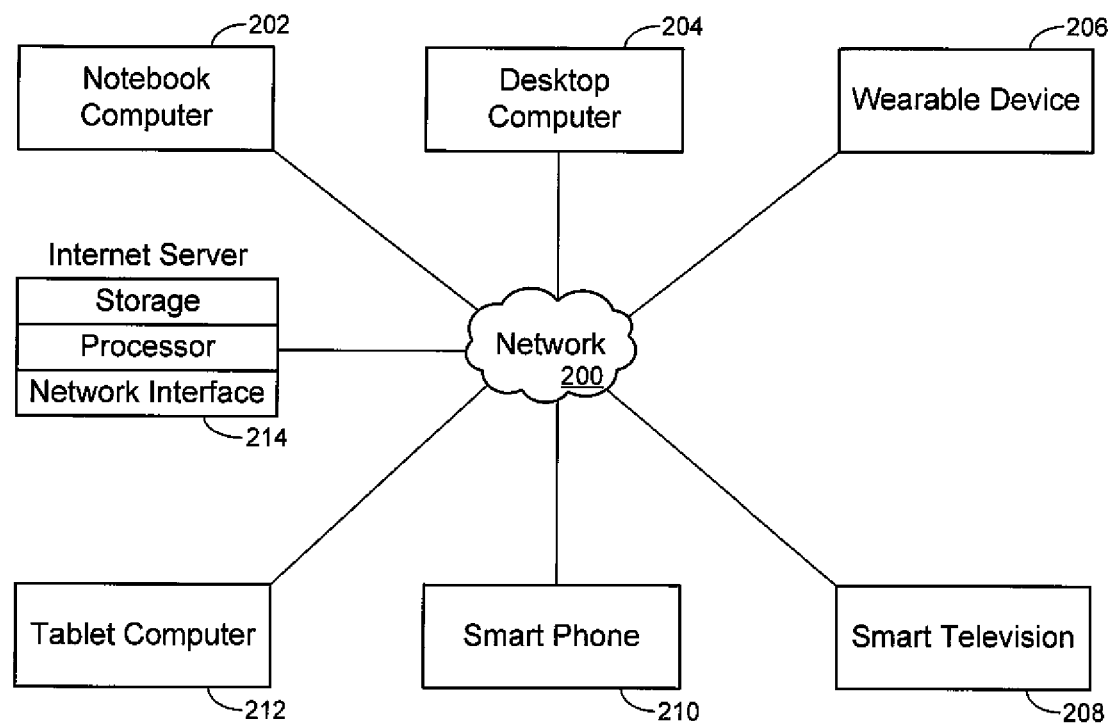
FIG. 2 is a block diagram of a network of devices in accordance with present principles.

Before moving on to FIG. 2 and as described herein, it is to be understood that an exemplary device or other machine/computer may include fewer or more features than shown on the system 100 of FIG. 1. In any case, it is to be understood at least based on the foregoing that the system 100 is configured to undertake present principles (e.g. receive input from a user, provide output based on the input, store and execute and/or undertake the logic described below, and/or perform any other functions and/or operations described herein).

Turning now to FIG. 2, it shows exemplary devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
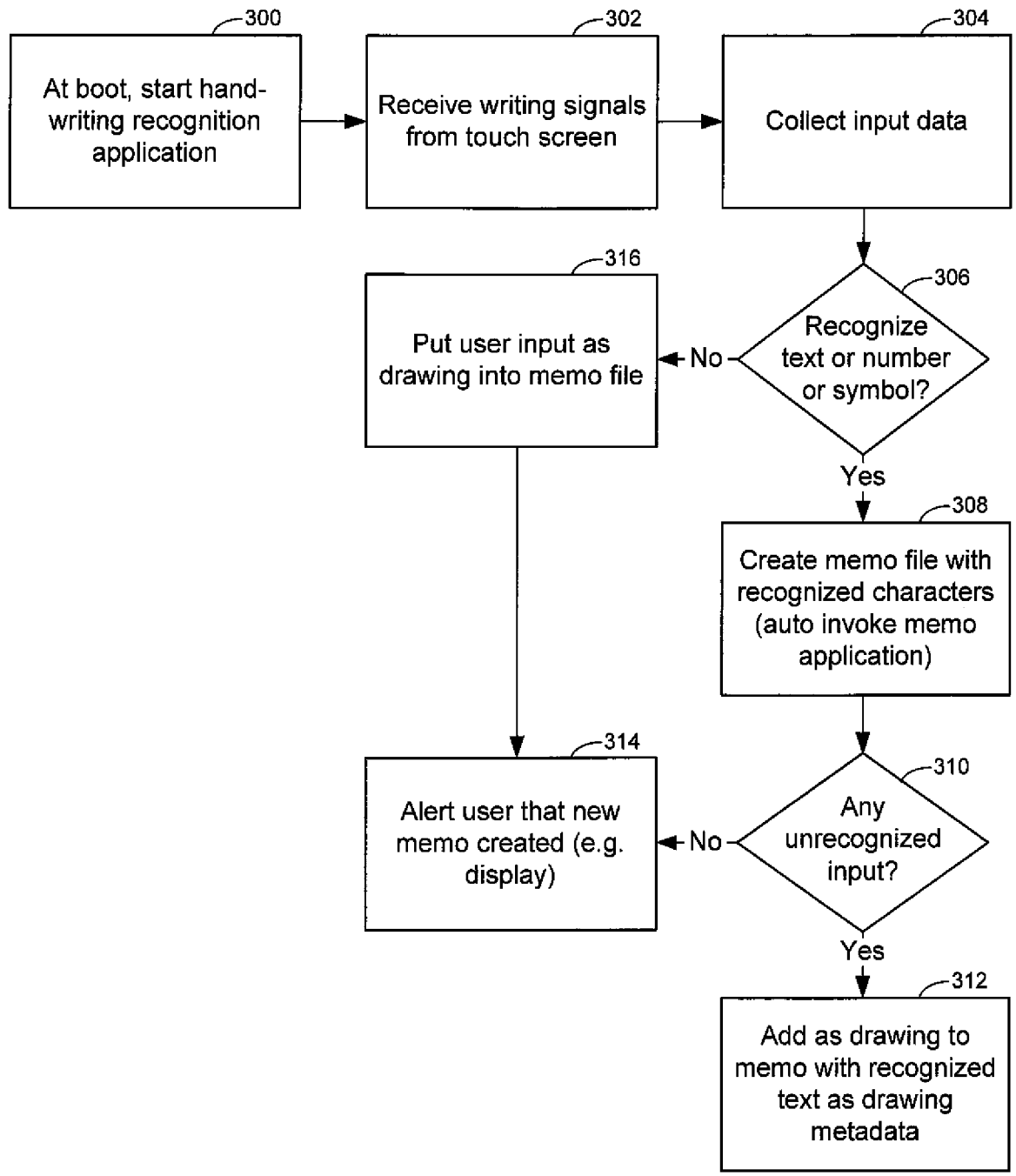
FIG. 3 is a flow chart of example logic.

FIG. 3 illustrates logic that may be executed by any of the foregoing devices, and in one example is executed by the smart phone 210 (FIG. 2) with touchscreen display 192 (FIG. 1). Commencing at block 300, in some examples, at boot time of the smart phone 210 a handwriting recognition engine is automatically started without user command to do so (e.g. other than selecting a power button on the device to initiate booting). Notwithstanding, the handwriting recognition engine may be started automatically without command at other than boot time if desired.

At block 302 handwriting signals are received on the touchscreen display. To determine that contact on the display is handwriting, the device may, by way of example, determine whether the input indicates other than an unmoving touch input. In an example, input can be determined to be an unmoving touch input responsive to determining that the input does not move over time a distance of more than a threshold number of pixels. Or, input can be determined to be an unmoving touch input responsive to determining that the input is confined to the boundary of an input selector element such as a shortcut tile. Inputs other than unmoving touch inputs are received as handwriting inputs at block 302.

Moving to block 304, the handwriting input is collected, e.g., in a temporary memory location, and at decision diamond 306 it is determined whether at least a portion of the handwriting input can be correlated by the engine to a character such as a symbol or letter or number. If so, the logic moves to block 308 to create a memo file, which may be a form of a word processing application file, with the recognized character(s) from decision diamond 306 being added to the file. Thus, the memo file is automatically invoked by the device processor along with, typically, an underlying memo or other word processing application that generates and manages the file.

The logic then flows to decision diamond 310 to determine whether any unrecognized portions of the handwriting input exist, and if so, those unrecognized portions may be added to the file at block 312 as a drawing that replicates the motion made by the user which generated the unrecognized portions. The recognized text in the file may be characterized or indicated in the file as being metadata pertaining to the drawing corresponding to the unrecognized portion.

From block 312 or from decision diamond 310 if no unrecognized portions of the handwriting input exist, the logic may proceed to block 314 to alert the user that a new memo has been created from the handwriting received at block 302. This may be done in some examples by displaying the memo as discussed further below.

As shown in FIG. 3, if it is determined at decision diamond 306 that no characters are recognized from the input classified as handwriting at block 302, the logic may flow to block 316 to add the handwriting to a new file, again automatically opened without user command and again invoking an underlying memo or other word processing application to do so if necessary. The logic flow from block 316 to block 314 to alert the user of the presence of the new memo.

Incidentally, a user may indicate termination of handwriting input at block 302 by inputting a predetermined "finished" signal, e.g., a two finger tap, or releasing contact on the touchscreen for a threshold period, etc.

Figure 4:
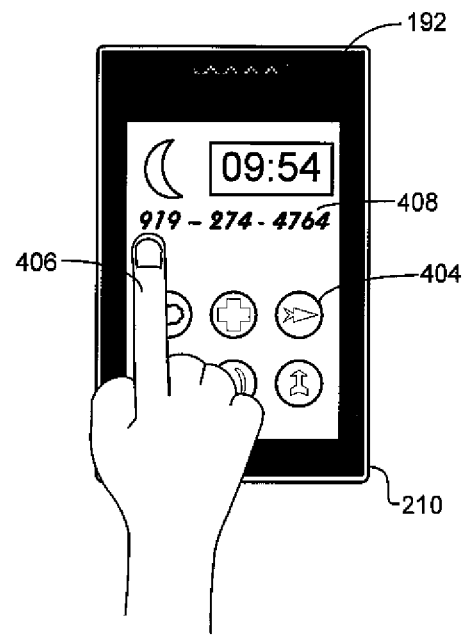
FIGS. 4 and 5 are example screen shots of user interfaces illustrating present principles.
Figure 5:
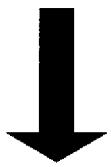
Figure 5:
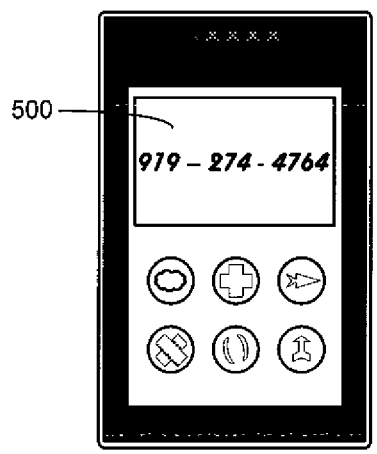

FIGS. 4 and 5 illustrate the above. As shown in FIG. 4, a desktop presentation with shortcut icons 404 is presented on the touchscreen 192 of the smart phone 210. Without initializing or otherwise starting up or invoking a word processing application such as a memo application including e.g. doing so from a lock and/or locked screen of the device, the user has traced (by use of his finger 406, although a stylus or other device may be used) against the touchscreen 192 handwriting 408, which is recognized by the handwriting engine running in the background as numeric input.

Accordingly, as shown in FIG. 5 a memo-type file has been created and presented at 500, showing the recognized input from FIG. 4.

While the particular AUTOMATIC LAUNCH AND DATA FILL OF APPLICATION is herein shown and described in detail, it is to be understood that the subject matter which is encompassed by the present application is limited only by the claims.

What is claimed is:

1. A computer readable storage medium that is not a transitory signal, the computer readable storage medium comprising instructions executable by at least one processor of a device to:
    execute a handwriting recognition engine responsive to a command to initiate booting of the device, the command being received based on selection of a power button on the device;
    receive input from a touch-enabled display;
    determine whether the input indicates handwriting;
    responsive to a determination that the input indicates handwriting, determine whether the input indicates a character;
    responsive to a determination that the input indicates a character, create a file and store the character in a file; and
    responsive to the determination that the input indicates a character, launch an application different from the hand writing recognition engine, the application being manipulable to manage the file.

\* \* \* \* \*